J. B. FORSTER.
ANTIRATTLER SHAFT COUPLING.
APPLICATION FILED NOV. 30, 1908.
936,230.
Patented Oct. 5, 1909.
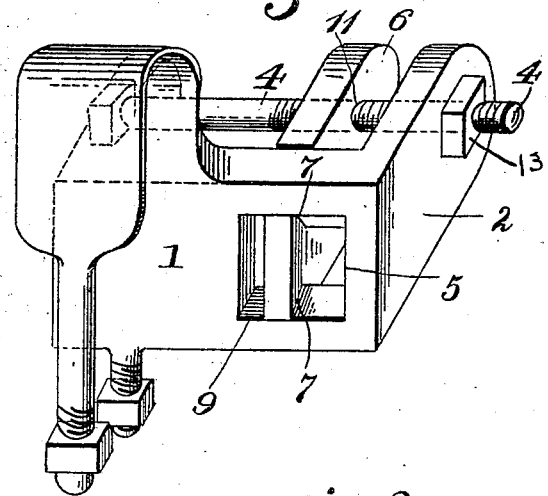
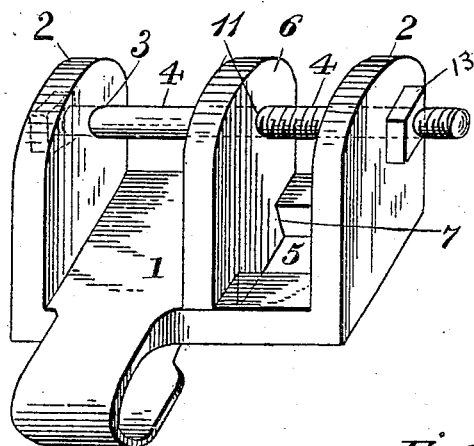
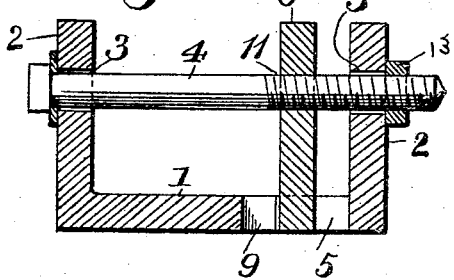
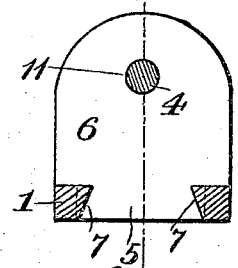
Witnesses
F. L. Durand.
M. K. Freeman
Inventor
John B. Forster
By Louis Bagger
his Attorneys

UNITED STATES PATENT OFFICE.

JOHN B. FORSTER, OF ST. MARYS, PENNSYLVANIA.

ANTIRATTLER SHAFT-COUPLING.

936,230.  Specification of Letters Patent.  Patented Oct. 5, 1909.

Application filed November 30, 1908.  Serial No. 465,171.

*To all whom it may concern:*

Be it known that I, JOHN B. FORSTER, a citizen of the United States, residing at St. Marys, in the county of Elk and State of Pennsylvania, have invented certain new and useful Improvements in Antirattler Shaft-Couplings, of which the following is a specification.

My invention relates to an improvement in anti-rattler shaft couplings, the object being to provide means for embracing the end of the shaft from the sides thereby preventing lateral play, and further to provide means which will prevent the accidental loss or displacement of parts comprising the invention.

With these objects in view my invention consists in a shackle having a lug slidably connected therewith, in combination with a bolt which turns in the slidable lug as a nut.

My invention further consists in certain novel features of construction and combinations of parts which will be hereinafter fully described and pointed out in the claims.

In the accompanying drawings—Figure 1 is a view in rear perspective, and Fig. 2 is a fragmentary view in perspective with the shackle turned over on its back. Fig. 3 is a view in horizontal section, and Fig. 4 is a view in cross section.

The numeral 1 indicates the back plate of the shackle, this being provided with the usual end lugs 2, 2 having the apertures 3, 3 therein adapted to receive the coupling bolt 4. The back plate is provided with a dovetail slot 5, and a slidable member 6 is provided with a shank, the edges 7, 7, of which fit and are guided upon the edges of the dovetail slot. The inner ends 9, 9, of the dovetail portion of the slot are cut away to allow the slidable member to be inserted or removed when at the inner end of the slot, thus affording a convenient means for assembling and disassembling the parts. The slidable member is provided with a threaded aperture 11.

The coupling bolt 4 is inserted through the apertures 3, 3 in the lugs 2, 2, and the socket in the end of the shafts or thills, and the threads of the bolt register with the threads of the aperture 11 as a nut in the slidable member. In this way by applying a wrench to the head of the bolt and turning it the slidable member is adjusted toward or away from the socket end of the shaft or thill whereby to prevent lateral movement and to provide against rattling of the parts. In this way the slidable member in reality becomes an adjustable nut which cannot fall out of place as it is held within the slot and upon the bolt. The nut 13 merely serves as a lock nut to prevent the bolt from turning after the movable lug is adjusted. In this way a simple and effective device is provided which absolutely precludes the rattling of shafts or thills, which is so annoying, without the use of springs or other parts liable to break or work out of place.

More or less slight changes might be resorted to in the form and arrangement of the parts described without departing from the spirit and scope of my invention, and hence I do not wish to be limited to the exact construction herein set forth, but:—

Having fully described my invention, what I claim as new and desire to secure by Letters Patent is:—

1. An anti-rattler shaft coupling comprising a slotted back plate having lugs on its ends with orifices through said lugs, a slidable member fitted to and guided by the slot in the back plate, and provided with a threaded aperture, and a bolt extending through the apertures in the lugs and member with its threads registering with the threads of the aperture in the slidable member.

2. An anti-rattler shaft coupling comprising a slotted back plate having lugs on its ends with apertures through said lugs, a slidable member fitted to and guided by the slot in the back plate and provided with a threaded aperture and a bolt extending through the apertures in the lugs and member with its threads registering with the threads of the aperture in the slidable member, the slot dovetailed throughout the greater portion of its length and enlarged at one end, and the slidable member having a shank adapted to enter or be removed through the enlarged portion of the slot and constructed to fit the dovetailed portion and adapted to be guided thereon in its movements.

In testimony whereof I affix my signature, in the presence of two witnesses.

JOHN B. FORSTER.

Witnesses:
ALOIS J. HAUBER,
F. A. ERICH.